US012373977B1

(12) United States Patent
Xu et al.

(10) Patent No.: US 12,373,977 B1
(45) Date of Patent: Jul. 29, 2025

(54) METHOD FOR MEASURING BEAM DIVERGENCE ANGLE OF HIGH-CURRENT PARTICLE BEAM BASED ON ONE-DIMENSIONAL CARBON FIBER COMPOSITE MATERIAL

(71) Applicant: Hefei Institutes of Physical Sciences, Chinese Academy of Sciences, Anhui (CN)

(72) Inventors: YongJian Xu, Anhui (CN); Yue Hu, Anhui (CN); Ling Yu, Anhui (CN); ChunDong Hu, Anhui (CN); YuanLai Xie, Anhui (CN)

(73) Assignee: Hefei Institutes of Physical Sciences, Chinese Academy of Sciences, Hefei (CN)

( * ) Notice: Subject to any disclaimer, the term of this patent is extended or adjusted under 35 U.S.C. 154(b) by 0 days.

(21) Appl. No.: 19/030,788

(22) Filed: Jan. 17, 2025

(30) Foreign Application Priority Data

Mar. 19, 2024 (CN) .......................... 202410311226.7

(51) Int. Cl.
*G01N 25/20* (2006.01)
*G06T 7/62* (2017.01)

(52) U.S. Cl.
CPC .............. *G06T 7/62* (2017.01); *G01N 25/20* (2013.01); *G06T 2207/10048* (2013.01); *G06T 2207/20041* (2013.01)

(58) Field of Classification Search
CPC ............ G06T 7/62; G06T 2207/10048; G06T 2207/20041; G01N 25/20
See application file for complete search history.

(56) References Cited

U.S. PATENT DOCUMENTS

| 5,559,335 A | 9/1996 | Zeng et al. |
| 2016/0367175 A1 | 12/2016 | Pasichnyk et al. |

FOREIGN PATENT DOCUMENTS

| CN | 102589482 A | 7/2012 |
| CN | 112433381 A | 3/2021 |

(Continued)

OTHER PUBLICATIONS

Andrea Rizzoloa, Mauro Dalla Palma, Michela De Muri, Gianluigi Serianni: "Design and analyses of a one-dimensional CFC calorimeter for SPIDER beam characterisation"; Oct. 23, 2010; Fusion Engineering and Design 85 (2268-2273) (Year: 2010).*
Antonio Pimazzoni, Matteo Brombin, Gloria Canocchi, Rita S. Delogu, Daniele Fasolo, Luca Franchin, Bruno Laterza, Roberto Pasqualotto, Gianluigi Serianni, and Marco Tollin: "Assessment of the SPIDER beam features by diagnostic calorimetry and thermography"; Mar. 2, 2020; Rev. Sci. Instrum. 91, 033301 (Year: 2020).*

(Continued)

*Primary Examiner* — Siamak Harandi
(74) *Attorney, Agent, or Firm* — Seed IP Law Group LLP

(57) ABSTRACT

The present disclosure discloses a method for measuring a beam divergence angle of a high-current particle beam based on a one-dimensional carbon fiber composite material, relating to the field of high-current particle beam diagnosis. The method includes: collecting infrared images according to experiment requirements by setting parameters of an infrared camera; obtaining original infrared images and temperature data files before and after beam current bombardment; converting an array file containing temperature information into an RGB picture format; performing perspective distortion correction on the acquired infrared images through a one-dimensional CFC diagnosis calorimeter and a geometric installation position of the infrared camera; converting the corrected image files into csv data format files; performing subtraction on a series of temperature data; selecting rows and columns to be analyzed for the plurality of csv data format files, retrieving a maximum value of temperatures within an area, and performing normalized Gaussian fitting; and analyzing a width at a 1/e height of the fitted Gaussian curve, and calculating the beam divergence angle according to a formula. The present disclosure provides a basis for operation parameter adjustment of an ion source and safe and stable operation of a system.

8 Claims, 6 Drawing Sheets

(56) References Cited

FOREIGN PATENT DOCUMENTS

CN         116563165 A    8/2023
WO         2022198386 A1  9/2022

OTHER PUBLICATIONS

Liping, Chen et al., "Neutral Beam Infrared Image Distortion Correction Based on Vanishing Point Detection," High Power Laser and Particle Beams, vol. 35, No. 2, 2023, 7 pages.
Pimazzoni et al., "Themo-mechanical Analysis of Unidirectional Carbon-Carbon Composite for Thermal Imaging Diagnostic of a Particle Beam," Fusion Engineering and Design, 2019, 5 pages.
Xu, Yongjian et al., "Feasibility Analysis of 1D Carbon Material in Application of Negative Particle Beam Diagnostics," Key Program of Research and Development of Hefei Science Center; National Natural Science Foundation of China; Institute of Plasma Physics Foundation of Chinese Academy of Sciences, 2017, 15 pages.

\* cited by examiner

METHOD FOR MEASURING BEAM DIVERGENCE ANGLE OF HIGH-CURRENT PARTICLE BEAM BASED ON ONE-DIMENSIONAL CARBON FIBER COMPOSITE MATERIAL

BACKGROUND

Technical Field

The present disclosure relates to the field of high-current particle beam diagnosis, in particular to a method for measuring a beam divergence angle of a high-current particle beam based on a one-dimensional carbon fiber composite material.

Description of the Related Art

A beam divergence angle is one of the key beam parameters of a neutral beam, and it is urgent to adopt an appropriate method for measuring a beam divergence angle of a high-current particle beam. A high-current particle beam diagnosis method includes: shooting a series of infrared images before and after beam current bombardment on a diagnosis calorimeter by using an infrared camera, and the infrared images can be processed and calculated to obtain a beam divergence angle. Due to high temperature and short pulse time generated by the bombardment of the high-current particle beam, it is necessary to obtain immediate beam distribution on the front side of the diagnosis calorimeter. Compared with the existing traditional diagnosis calorimeter which is made of an isotropic heat transfer metal material, accurate analysis of beam current optics cannot be met, so the diagnosis calorimeter needs to have high temperature resistance and high anisotropic heat transfer characteristics. Due to an installation angle of the infrared camera, the infrared images in front view cannot be obtained, so it is necessary to perform perspective distortion correction on the images, perform data processing on a series of corrected images, and calculate a beam divergence angle.

BRIEF SUMMARY

To solve the above technical problems, the present disclosure proposes a method for measuring a beam divergence angle of a high-current particle beam based on a one-dimensional carbon fiber composite material, and provides the diagnosis accuracy that satisfies requirements. The present disclosure solves the problem of distortion correction of infrared images, realizes data processing for a plurality of frames of pictures at the same time through data processing, provides a complete and effective method from data collection, data preprocessing and data analysis, and lays the foundation for the accurate analysis of a beam divergence angle.

To fulfill said object, the present disclosure adopts the following technical solutions.

A method for measuring a beam divergence angle of a high-current particle beam based on a one-dimensional carbon fiber composite material includes the following steps:

step 1, setting parameters of an infrared camera according to measurement requirements;

step 2, acquiring infrared images and temperature data files in a csv format before and after beam current bombardment of a high-current particle beam, wherein temperature data in the temperature data files in the csv format corresponds to temperature distribution on a back of the one-dimensional CFC diagnosis calorimeter, where CFC represents a one-dimensional carbon fiber composite material;

step 3, converting the temperature data files in the csv format that contain the temperature data into an RGB picture format;

step 4, performing perspective distortion correction on the picture files converted in step 3 through the one-dimensional CFC diagnosis calorimeter and a geometric installation position of the infrared camera to obtain corrected pictures;

step 5, converting the pictures corrected in step 4 into temperature data files in a csv format for data analysis and processing;

step 6, performing subtraction on temperature data at different moments and temperature data at an initial moment, and forming a new temperature data file in a csv format;

step 7, processing the new temperature data file in the csv format obtained in step 6, selecting rows and columns to be analyzed as a retrieved area, retrieving a maximum value of temperatures within the retrieved area, and performing normalized Gaussian fitting to obtain a fitted Gaussian curve; and step 8, calculating a width at a 1/e height of the fitted Gaussian curve, e being a natural constant, and calculating a beam divergence angle.

Further, the thermal conductivity of the one-dimensional CFC diagnosis calorimeter in a vertical direction is greater than 20 times that of the thermal conductivity in a plane direction; and when the beam current bombardment of the high-current particle beam reaches 2000° C. in a vacuum environment, physical properties and chemical properties of the one-dimensional CFC diagnosis calorimeter remain stable, and the temperature distribution on the back of the one-dimensional CFC diagnosis calorimeter reflects power density distribution of a beam current of the high-current particle beam.

Further, in step 1, a collection moment, a frame frequency and a number of collected frames are set.

Further, step 2 includes: acquiring infrared images in a RGB picture format before and after beam current bombardment on the one-dimensional CFC diagnosis calorimeter with the beam current of the high-current particle beam, including: drawing the beam current of the high-current particle beam from an accelerator and bombarding a surface of the one-dimensional CFC diagnosis calorimeter; and shooting a rear side of the one-dimensional CFC diagnosis calorimeter from a certain included angle by using the infrared camera to obtain the infrared images and the temperature data files in the csv format, wherein the temperature data in the temperature data files in the csv format are in one-to-one correspondence to temperature values on the one-dimensional CFC diagnosis calorimeter; and converting the temperature data file in the csv format that contains the temperature data into an RGB picture format.

Further, step 3 includes: graying an image in an RGB picture format, and converting a value of each component of RGB three channels into a gray value of each pixel.

Further, step 4 includes: calculating a homography matrix according to a perspective relationship, and performing perspective transformation on an image converted from the temperature data files in the CSV format that contain the temperature data to obtain the corrected picture.

Further, step 5 includes: extracting a maximum value and a minimum value from the temperature data files in the csv format collected by the infrared camera in step 2, and then converting the corrected picture in step 4 into a temperature data file in a csv format.

Further, step 6 includes: denoting the converted temperature data files in the csv format in step 5 as F1, F2, . . . Fn; and performing subtraction on the converted temperature data files and a temperature data file F0 in the csv format converted from the corrected picture at the initial moment before the beam current bombardment of the high-current particle beam to obtain new temperature data files F1-F0, F2-F0, . . . Fn-F0 in a csv format.

Further, a half-width Δx of an abscissa corresponding to the 1/e height of the fitted curve, a half-width Δy of an ordinate and a radius r of an ion source electrode plate hole are taken, and the beam divergence angle σ is calculated in conjunction with a distance D from the one-dimensional CFC diagnosis calorimeter to an ion source electrode according to the following formula:

$$\sigma = \arctan\frac{\Delta x - r}{D} \text{ or } \sigma = \arctan\frac{\Delta y - r}{D}.$$

The present disclosure has the following beneficial effects.

According to the present disclosure, a series of images are corrected by using an algorithm; the data of the plurality of frames of infrared images is processed through a data processing program; the temperature data of the corrected image is selected and normalized; the Gaussian curve is obtained by fitting; the half-width Δx(Δy) of an abscissa (ordinate) corresponding to the 1/e height of the fitted curve and the radius r of the ion source electrode plate hole are taken; the beam divergence angles of a series of one-dimension CFC calorimeters are calculated in conjunction with the distance D from an ion source electrode outlet to the diagnosis calorimeter; and according to the obtained parameters such as a beam profile, the beam divergence angle and beam uniformity, a basis is provided for the adjustment of operating parameters of the ion source and the safe and stable operation of the system.

DETAILED DESCRIPTION

The following will clearly and completely describe the technical solutions in the embodiments of the present disclosure in conjunction with the accompanying drawings in the embodiments of the present disclosure. Obviously, the described embodiments are only some embodiments of the present disclosure, not all embodiments. Based on the embodiments in the present disclosure, all other embodiments derived by a person of ordinary skill in the art without creative efforts shall fall within the protection scope of the present disclosure.

Figure 1:
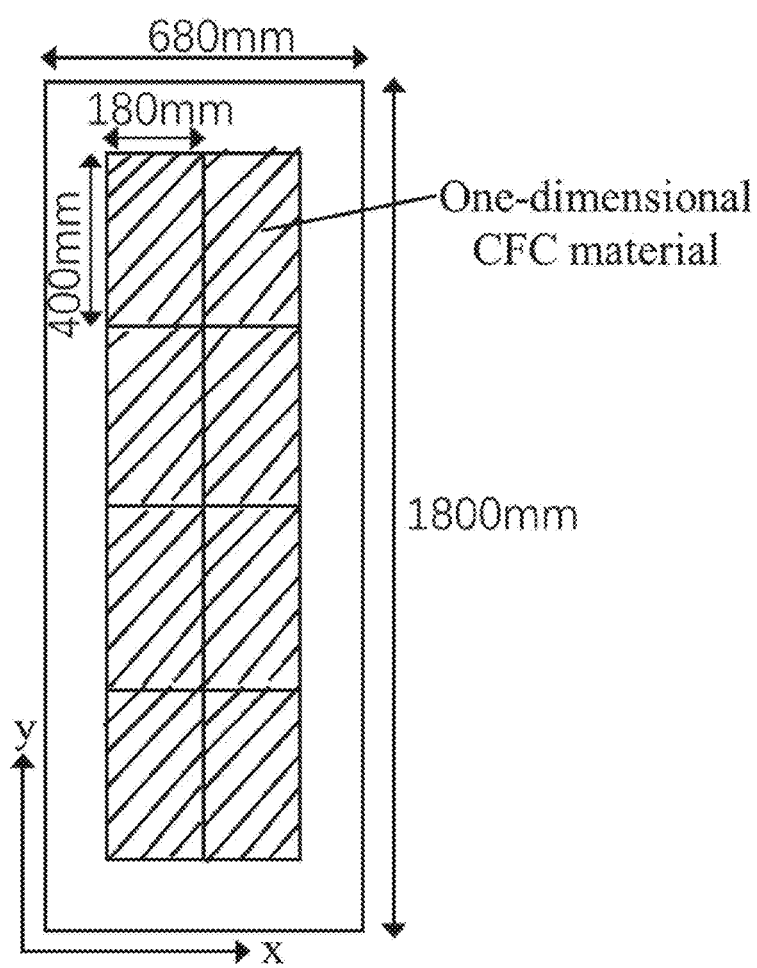
FIG. 1 is a schematic diagram of a CFC diagnosis calorimeter for the calculation of a beam divergence angle provided by an embodiment of the present disclosure.

In order for a neutral beam to reliably and stably achieve plasma heating, it is necessary to diagnose key beam parameters such as beam uniformity and beam divergence angle. The beam parameters, such as the beam divergence angle, are obtained by analyzing infrared images of beam current bombardment on a calorimeter surface. A one-dimensional CFC material is highly anisotropic in thermal conductivity and has thermal conductivity in a vertical direction much greater than that in a horizontal direction (>20 times). When a beam current bombards the calorimeter surface, its energy is converted into the internal energy of a calorimeter plate and transmitted along the calorimeter plate, the heat is mainly conducted from the front side of the calorimeter to the back of the calorimeter plate along a thickness direction within a short time (less than 2 s), and the conduction along the plane direction of the calorimeter plate is negligible. As shown in FIG. 1, a calorimeter plane consists of eight CFC calorimeter plates, each of which is a one-dimensional CFC material. The infrared camera is used to shoot hot spots on the back of the calorimeter plate, and beam parameters can be obtained by analyzing the infrared images. Due to an installation angle of the camera, the infrared image is geometrically distorted, and the image correction needs to be carried out, followed by data processing, so as to obtain a beam divergence angle finally. The calorimeter plane of the one-dimensional CFC diagnosis calorimeter has a height of 1800 mm and a width of 680 mm. The calorimeter plane consists of eight one-dimensional CFC materials each having a height of 400 mm, a width of 180 mm and a thickness of 20 mm.

Figure 2:
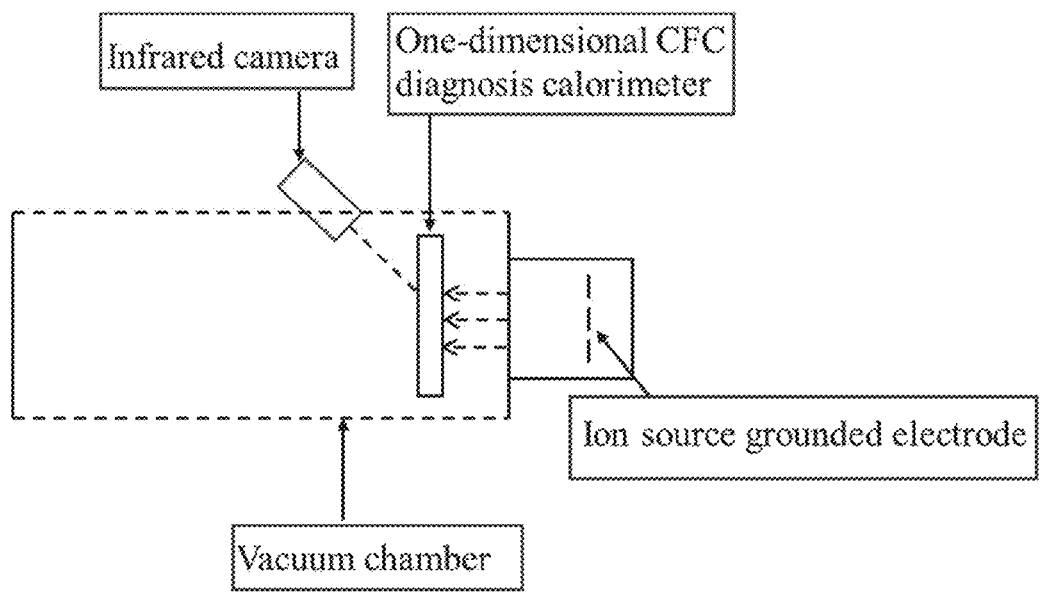
FIG. 2 is a schematic diagram of an experimental platform according to an embodiment of the present disclosure.

As shown in FIG. 2, an experimental platform of the present disclosure consists of an ion source, a vacuum chamber, an infrared camera and a one-dimensional CFC diagnosis calorimeter. A shooting angle of the infrared camera is at a certain included angle to the calorimeter surface. An ion source grounded electrode is parallel to a one-dimensional CFC diagnosis calorimeter. A beam current is drawn from an accelerator and bombards on the surface of the one-dimensional CFC diagnosis calorimeter. The back of the calorimeter is shot with the infrared camera to obtain infrared images.

Figure 6:
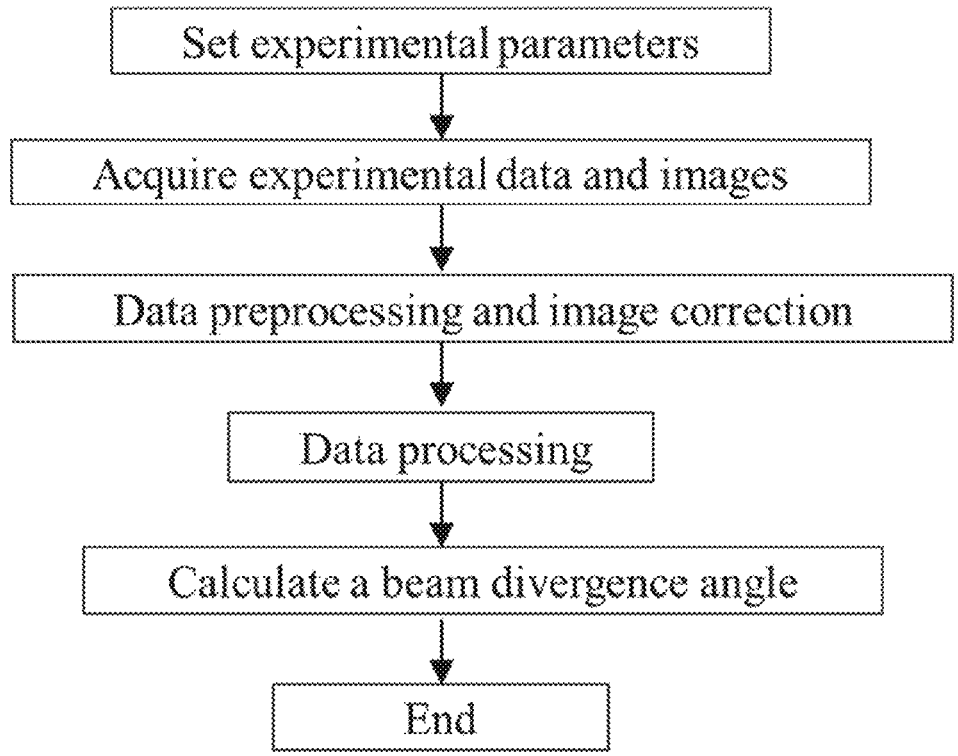
FIG. 6 is a flowchart of a method for measuring a beam divergence angle of a high-current particle beam based on a one-dimensional carbon fiber composite material of the present disclosure.

As shown in FIG. 6, a method for measuring a beam divergence angle of a high-current particle beam based on a one-dimensional carbon fiber composite material of the present disclosure includes: setting experimental parameters; acquiring experimental data and images; performing data preprocessing and image correction, and data processing; and calculating the beam divergence angle, to be specific:

step 1, setting collection parameters of an infrared camera according to measurement requirements;

step 2, acquiring infrared images and temperature data files in a csv format before and after beam current bombardment, wherein temperature data in temperature data files in a csv format corresponded to temperature distribution on the back of the one-dimensional CFC diagnostic calorimeter where CFC represents a one-dimensional carbon fiber composite material;

step 3, converting the temperature data files in the csv format that contain the temperature data into an RGB picture format;

step 4, performing perspective distortion correction on the picture files converted in step 3 according to the one-dimensional CFC diagnosis calorimeter and a geometric installation position of the infrared camera to obtain corrected pictures;

step 5, converting the pictures corrected in step 4 into temperature data files in a csv format for data analysis and processing;

step 6, performing subtraction on temperature data at different moments and temperature data at an initial moment, and forming a new temperature data file in a csv format;

step 7, processing the new temperature data file in the csv format obtained in step 6, selecting rows and columns to be analyzed as a retrieved area, retrieving a maximum value of temperatures within the retrieved area, and performing normalized Gaussian fitting to obtain a fitted Gaussian curve; and step 8, calculating a width at a 1/e height of the fitted Gaussian curve, e being a natural constant, and calculating a beam divergence angle.

Figure 3:
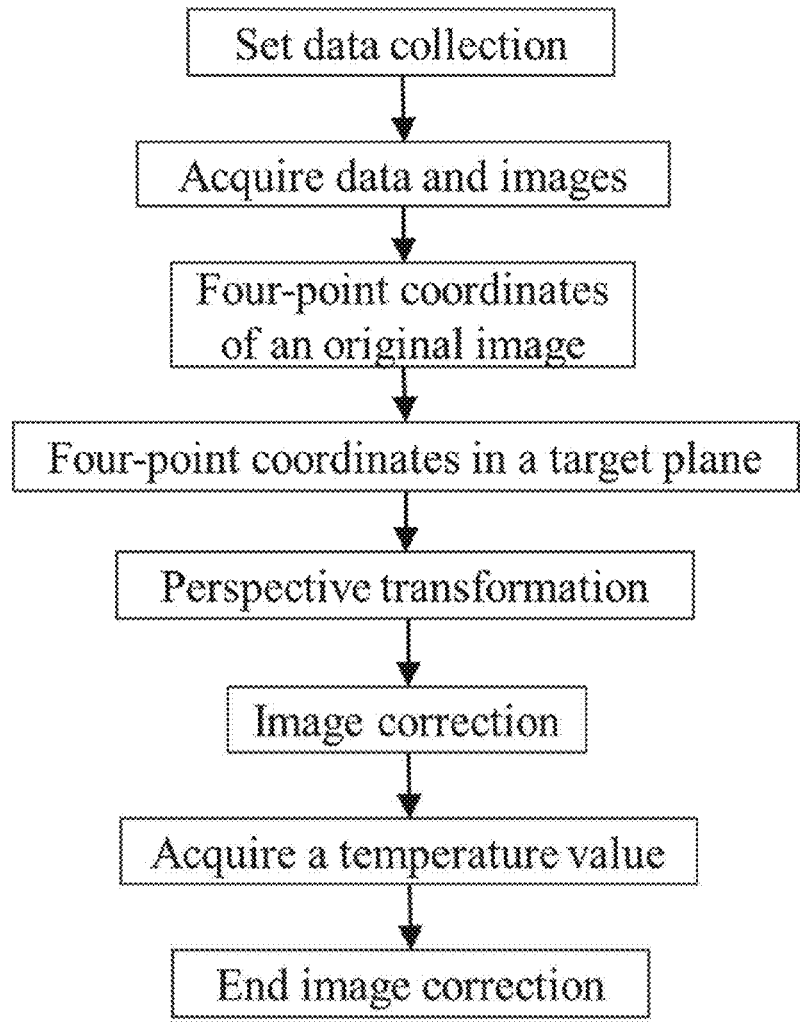
FIG. 3 is a flowchart of an image correction method provided by an embodiment of the present disclosure.

As shown in FIG. 3, a flowchart of an image correction method provided by an embodiment of the present disclosure includes: first determining experimental conditions of the one-dimensional CFC diagnosis calorimeter, wherein the experimental conditions include that the ion source can emit beams stably, and the infrared camera is installed obliquely behind the one-dimensional CFC diagnosis calorimeter, at a certain angle to the calorimeter plate; setting data collection; setting parameters of the infrared camera, acquiring data and images, and collecting data of moments of interest before and after beam current bombardment; converting a csv file containing the temperature data into an RGB three-channel color picture; obtaining four-point coordinates of an original image and four-point coordinates in a calorimeter plane through an image distortion correction program; obtaining a homography transformation matrix between two planes through a corresponding relationship between feature points in the infrared images converted from the above temperature data and the real world; and obtaining the corrected image through perspective transformation. A maximum value and a minimum value are extracted from original temperature data, a temperature value is acquired by converting the corrected image into CSV temperature data, and then the image correction is ended.

Figure 4:
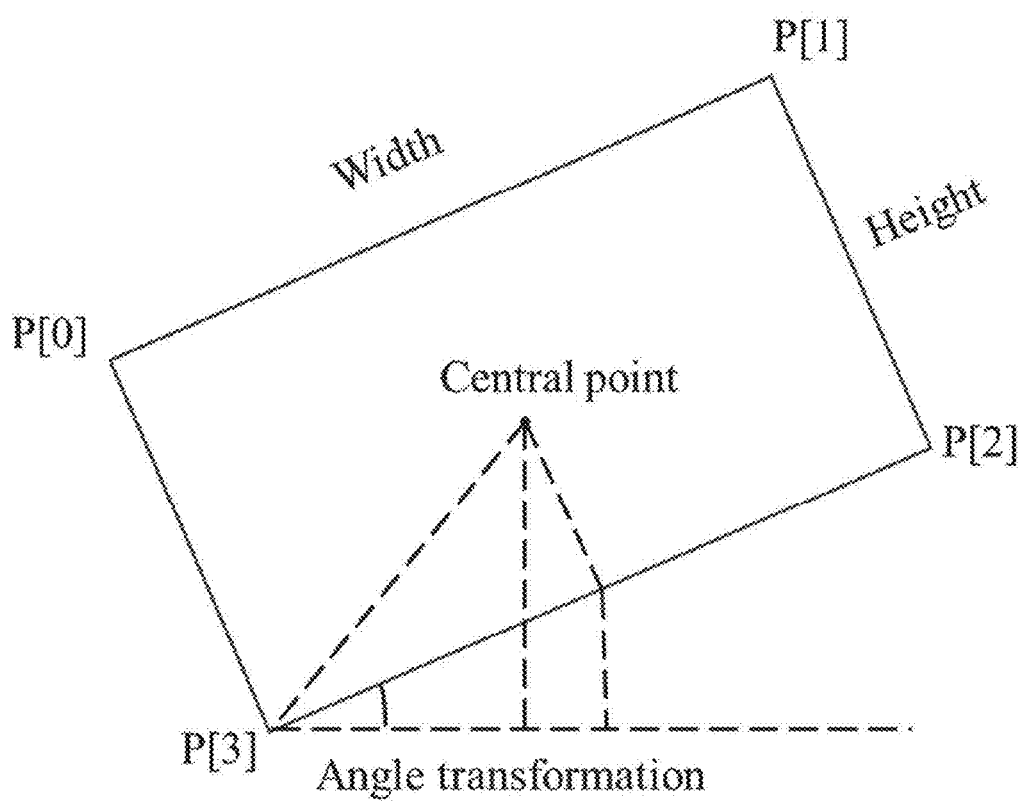
FIG. 4 is a schematic diagram of perspective transformation in the image correction method provided by the embodiment of the present disclosure.

Image correction is divided into three steps. In the first step, the four-point coordinates of the original image are acquired. In the second step, the four-point coordinates in the calorimeter plane to be corrected in the original image are selected. In the third step, perspective transformation is performed. In the second step, four target points (as shown in FIG. 4) to be transformed need to be acquired, and an order of acquiring the coordinates of RotatedRect-class four-vertex coordinates is sequentially as follows: top left-top right-bottom right-bottom left (which may be viewed in sequence by displaying vertices). The four vertices of the target image in which a center point r and a transformed angle are given are as follows: P[0]-P[1]-P[2]-P[3]. For each pixel on the original image, its corresponding position on the corrected image is calculated by a mapping relationship.

In the third step, according to the corresponding positions on the calculated corrected image, interpolation or resampling operations are performed to acquire a final perspectively-transformed image.

A calculation formula of the beam divergence angle σ is as follows:

$$\sigma = \arctan\frac{\Delta x - r}{D} \text{ or } \sigma = \arctan\frac{\Delta y - r}{D}.$$

Figure 7:
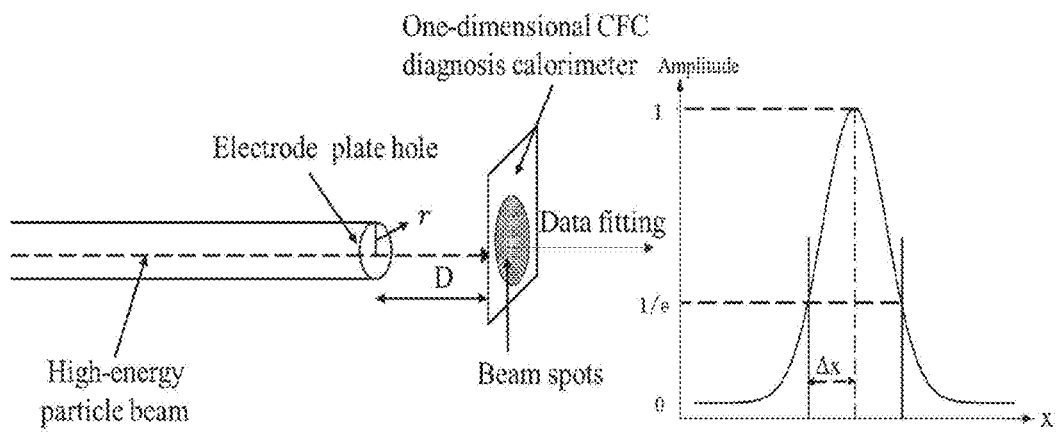
FIG. 7 is a schematic diagram of the calculation of a beam divergence angle provided by an embodiment of the present disclosure.

As shown in FIG. 7, the high-energy particle beam bombards the one-dimensional CFC diagnosis calorimeter through the electrode plate hole, beam spots are formed on the back of the one-dimensional CFC diagnosis calorimeter, and various parameters in the calculation formula of the beam divergence angle are obtained by data fitting. $\Delta x$ ($\Delta y$) is the half-width of an abscissa (ordinate) corresponding to the 1/e height of the normalized Gaussian fitted curve, e being a normal constant. r is a radius of the ion source electrode plate hole. D is a distance between the one-dimensional CFC diagnosis calorimeter to the ion source electrode.

Figure 5:
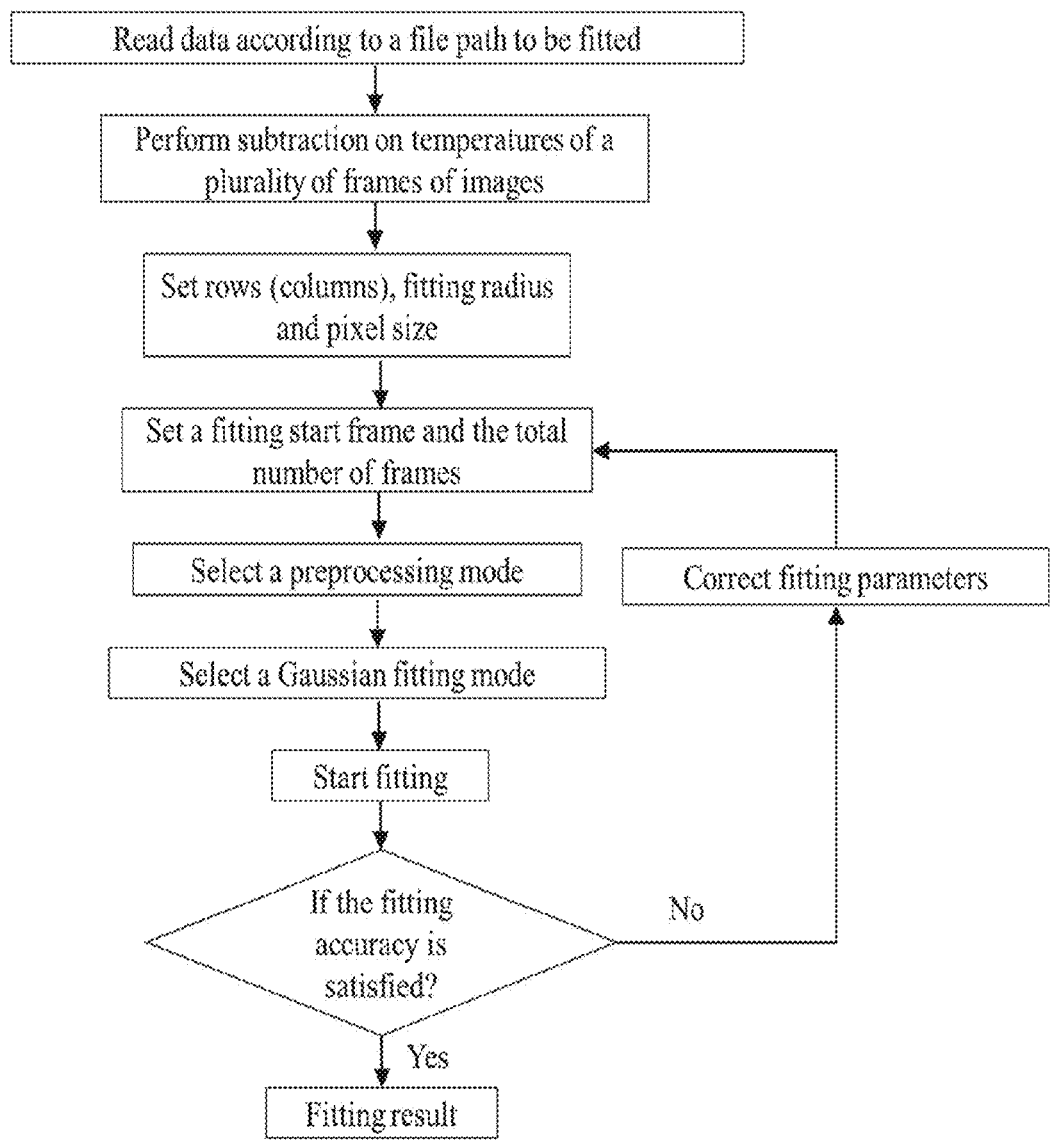
FIG. 5 is a data processing flowchart in a method for measuring a beam divergence angle provided by an embodiment of the present disclosure.

According to the calculation formula of the beam divergence angle, a series of corrected infrared images are taken, and picture data and reference picture data of the initial time (before beam current bombardment) are subjected to subtraction to obtain new data files of the infrared images. A maximum value of temperatures in an area to be analyzed of the one-dimensional CFC diagnosis calorimeter is determined by retrieval. The normalized temperature values in an x-axis direction and a y-axis direction on this area are subjected to Gaussian fitting, respectively. The data processing flowchart in the method for measuring the beam divergence angle is shown in FIG. 5. Firstly, read data according to the path of the file to be fitted. The temperatures of a plurality of frames of images are subjected to subtraction. Rows (columns), fitted area, pixel size, fitting start frame, and the total number of frames are set. A preprocessing mode and a Gaussian fitting mode are selected. Fitting is started to determine whether the fitting accuracy is satisfied. If the fitting accuracy is satisfied, a fitting result is outputted, and then fitting is ended. If the fitting accuracy is not satisfied, fitting parameters are modified.

Although the specific illustrative embodiments of the present disclosure are described above, the present disclosure may be understood by a person skilled in the art. In addition, it should be clear that the present disclosure is not limited to the scope of specific embodiments. For a person of ordinary skill in the art, as long as various changes are within the spirit and scope of the present disclosure limited and determined by the attached claims, these changes are obvious, and all disclosures and creations that make use of the present disclosure are protected.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for measuring a beam divergence angle of a high-current particle beam based on a one-dimensional carbon fiber composite material, comprising:

step 1, setting collection parameters of an infrared camera according to measurement requirements;

step 2, acquiring infrared images of a diagnosis calorimeter and temperature data files in a csv format before and after beam current bombardment of a high-current particle beam, wherein temperature data in the temperature data files in the csv format corresponds to temperature distribution on a back of the one-dimensional CFC diagnosis calorimeter, where CFC represents a one-dimensional carbon fiber composite material;

step 3, converting the temperature data files in the csv format that contain the temperature data into an RGB picture format;

step 4, performing perspective distortion correction on the picture files converted in step 3 through the one-dimensional CFC diagnosis calorimeter and a geometric installation position of the infrared camera to obtain corrected pictures;

step 5, converting the pictures corrected in step 4 into temperature data files in a csv format for data analysis and processing;

step 6, performing subtraction on temperature data at different moments in step 5 and temperature data at an initial moment before the beam current bombardment of the high-current particle beam, and forming a new temperature data file in a csv format;

step 7, processing the new temperature data file in the csv format obtained in step 6, selecting rows and columns to be analyzed as a retrieved area, retrieving a maximum value of temperatures within the retrieved area, and performing normalized Gaussian fitting to obtain a fitted Gaussian curve; and step 8, calculating a width at a 1/e height of the fitted Gaussian curve, e being a natural constant, and calculating a beam divergence angle; and taking a half-width Δx of an abscissa corresponding to the 1/e height of the fitted curve, a half-width Δy of an ordinate and a radius r of an ion source electrode plate hole, and calculating the beam divergence angle σ in conjunction with a distance D from the one-dimensional CFC diagnosis calorimeter to an ion source electrode according to the following formula:

$$\sigma = \frac{\Delta x - r}{D} \text{ or } \sigma = \frac{\Delta y - r}{D}.$$

2. The method for measuring the beam divergence angle of the high-current particle beam based on the one-dimensional carbon fiber composite material according to claim 1, wherein the thermal conductivity of the one-dimensional CFC diagnosis calorimeter in a vertical direction is greater than 20 times that of the thermal conductivity in a plane direction; and when the beam current bombardment of the high-current particle beam reaches 2000° C. in a vacuum environment, physical properties and chemical properties of the one-dimensional CFC diagnosis calorimeter remain stable, and the temperature distribution on the back of the one-dimensional CFC diagnosis calorimeter reflects power density distribution of a beam current of the high-current particle beam.

3. The method for measuring the beam divergence angle of the high-current particle beam based on the one-dimensional carbon fiber composite material according to claim 1, wherein in step 1, the collection parameters of the infrared camera are set, and the collection parameters comprise a collection moment, a frame frequency and a number of collected frames.

4. The method for measuring the beam divergence angle of the high-current particle beam based on the one-dimensional carbon fiber composite material according to claim 1, wherein step 2 comprises:

acquiring infrared images of the one-dimensional CFC diagnosis calorimeter before and after beam current bombardment with the beam current of the high-current particle beam, comprising:

drawing the beam current of the high-current particle beam from an accelerator and bombarding a surface of the one-dimensional CFC diagnosis calorimeter; and shooting a rear side of the one-dimensional CFC diagnosis calorimeter from a certain included angle to obtain the infrared images and the temperature data files in the csv format, wherein the temperature data in the temperature data files in the csv format are in one-to-one correspondence to temperature values on the one-dimensional CFC diagnosis calorimeter.

5. The method for measuring the beam divergence angle of the high-current particle beam based on the one-dimensional carbon fiber composite material according to claim 1, wherein step 3 comprises:

graying an image in a RGB picture format, and converting a value of each component of RGB three channels into a gray value of each pixel.

6. The method for measuring the beam divergence angle of the high-current particle beam based on the one-dimensional carbon fiber composite material according to claim 1, wherein step 4 comprises:

calculating a homography matrix according to a perspective relationship, and then performing perspective transformation on an image converted from the temperature data files in the CSV format that contains the temperature data to obtain the corrected picture.

7. The method for measuring the beam divergence angle of the high-current particle beam based on the one-dimensional carbon fiber composite material according to claim 1, wherein step 5 comprises:

extracting a maximum value and a minimum value from the temperature data files in the csv format collected by the infrared camera in step 2, and then converting the corrected picture into a temperature data file in a csv format.

8. The method for measuring the beam divergence angle of the high-current particle beam based on the one-dimensional carbon fiber composite material according to claim 1, wherein step 6 comprises:

denoting the converted temperature data files in the csv format in step 5 as F1, F2, . . . Fn; and performing subtraction on the converted temperature data files and a temperature data file F0 in the csv format converted from the corrected picture at the initial moment before the beam current bombardment of the high-current particle beam to obtain new temperature data files F1-F0, F2-F0, . . . Fn-F0 in a csv format.

* * * * *